(12) United States Patent
DiDavide et al.

(10) Patent No.: US 8,821,605 B2
(45) Date of Patent: Sep. 2, 2014

(54) SINTERED ABRASIVE GRAIN AGGLOMERATES

(75) Inventors: Maria Christina DiDavide, Zauchen-Villach (AT); Reiner Kunz, Laufenburg (DE)

(73) Assignee: Center for Abrasives and Refractories Research & Development C.A.R.R.D. GmbH, Villach (AT)

( * ) Notice: Subject to any disclaimer, the term of this patent is extended or adjusted under 35 U.S.C. 154(b) by 654 days.

(21) Appl. No.: 13/056,901

(22) PCT Filed: Jul. 21, 2009

(86) PCT No.: PCT/EP2009/005296
§ 371 (c)(1), (2), (4) Date: Apr. 28, 2011

(87) PCT Pub. No.: WO2010/012405
PCT Pub. Date: Feb. 4, 2010

(65) Prior Publication Data
US 2012/0110921 A1    May 10, 2012

(30) Foreign Application Priority Data
Jul. 30, 2008    (DE) .......................... 10 2008 035 515

(51) Int. Cl.
*B24D 3/00* (2006.01)
*B24D 11/00* (2006.01)
*B24D 18/00* (2006.01)
*C09K 3/14* (2006.01)
*B24D 3/02* (2006.01)
*C09C 1/68* (2006.01)

(52) U.S. Cl.
CPC ................................... *C09K 3/1418* (2013.01)
USPC .................................. 51/309; 51/293; 51/307

(58) Field of Classification Search
USPC ........................................... 51/309, 293, 307
See application file for complete search history.

(56) References Cited

U.S. PATENT DOCUMENTS

| | | | |
|---|---|---|---|
| 2007/0062124 A1* | 3/2007 | Endoh et al. | 51/307 |
| 2008/0064312 A1* | 3/2008 | Sinram et al. | 451/540 |
| 2011/0219607 A1* | 9/2011 | Nanjundaswamy et al. | 29/623.1 |

FOREIGN PATENT DOCUMENTS

| | | |
|---|---|---|
| DE | 103 92 532 B4 | 4/2006 |
| DE | 10 2005 007 661 A1 | 8/2006 |
| DE | 102005 033392 A1 | 1/2007 |
| EP | 0 725 045 A | 8/1996 |

* cited by examiner

Primary Examiner — James McDonough
(74) Attorney, Agent, or Firm — Law Firm of Ursula B. Day

(57) ABSTRACT

The present invention relates to sintered abrasive grit agglomerates based on aluminum oxide, having homogeneously distributed nanoscale pores in the range of 100-300 nm, with a pore volume of at least 15%. The average diameter of primary particles of the aluminum oxide primary particles is less than 5 μm, wherein said primary particles are connected to each other without additional adhesive agent.

15 Claims, 4 Drawing Sheets

SINTERED ABRASIVE GRAIN AGGLOMERATES

CROSS-REFERENCES TO RELATED APPLICATIONS

This application is the U.S. National Stage of International Application No. PCT/EP2009/005296, filed Jul. 21, 2009, which designated the United States and has been published as International Publication No. WO 2010/012405 and which claims the priority of German Patent Application, Serial No. 10 2008 035 515.1, filed Jul. 30, 2008, pursuant to 35 U.S.C. 119(a)-(d).

BACKGROUND OF THE INVENTION

The present invention refers to sintered abrasive grain agglomerates with a portion of aluminum oxide of at least 80% by weight, an average primary particle diameter of less than 5 µm, an substantially spherical outer shape, with a portion of pores of at least 15% by volume and a mean agglomerate size in the range between 5 µm to 500 µm.

The present invention also refers to a process for producing sintered abrasive grain agglomerates as well as their use as lapping agents for the production of organically or inorganically bonded abrasive bodies, for the production of abradants used on a substrate as well as in wear protection layers.

Abrasive grain agglomerates are known in many variations for some length of time and normally are used in connection with bonded abradants such as for example abrasive disks, or abradants on substrates such as for example abrading belts. Abrasive grain agglomerates are normally constructed from single abrasive grains, the primary particles that are bonded together by means of a binder into a abrasive grain agglomerate. As binding agents either organic or inorganic binders can be utilized, wherein phenol resins are oftentimes used as organic binders, while glass-like or ceramic binders are used as inorganic bonding agents.

The big advantage of abrasive grain agglomerates is in fact that finely grained abradants can be utilized as primary particles from which an agglomerate grain is then formed which, as compared to a single grain of comparable size, exhibits an entirely different wearing mechanism during the abrading- and wearing process. A single grain of comparable size, according to pressure conditions, either dulls during the abrading process, or it will be destroyed. In contrast, with the abrasive grain agglomerate, the abrading conditions are selected so that single grains break out from the compound, such that new cutting edges are constantly formed which lend the agglomerate grain a long life expectancy while showing a cool smoothness and a homogenously polished section. A further advantage of the abrasive grain agglomerate is that in this manner, the finest abrasive grains can be utilized for abrading processes and abrading tools, for which they are otherwise not suited due to their small grain size.

In DE 103 92 532 B4, abrasive grain agglomerates are described which comprise a multitude of abrasive grains that are held together with a bonding agent, wherein the bonding material has a melting temperature in the range of 500° C. to 1400° C. In DE 103 92 532 B4, a method for the production of such abrasive grain agglomerates is also described, wherein the abrasive grains are mixed with a bonding agent and subsequently are subjected to a heat treatment in a revolving furnace in a temperature range of 145° C. to 1300° C. The agglomerates that are thus obtained have a total porosity between 35% by volume and 80% of volume, wherein at least 30% by volume of the pores are interconnected. In this process, elongated agglomerates are formed that have a length ratio of length to cross section of at least 5:1. As a bonding agent, glass-like bonding materials, vitrified materials, ceramic materials, inorganic bonding agents, organic bonding agents and combinations of these are utilized. The so obtained abrasive grain agglomerates should be most of all used in bonded abradants in order to control the properties of porosity and the porosity in the form of a permeable and interconnected porosity.

In DE 10 2005 007 661 A1, abrasive bodies are described that are formed and bonded together by means of a bonding agent into abrasive grains in material union and exhibiting at least approximately a spherical outer shape, wherein the abrasive grains have a porosity of at least 35% by volume. These abrasive grain agglomerates are formed from single abrasive grains, with a particle size in the range between of 0.05 µm and 150 µm, which are then joined with abrasive grain agglomerates with an outer diameter in the range of 10 µm and 150 µm. In the abrading tools, these agglomerates are utilized that are graded narrowly, as quasi constant grainings. Binders that are preferred are organic binders, such as for example phenol resins, polyurethane, epoxide resins, urea resin and poly vinyl butyral. These agglomerate abrasive grains are meant especially for utilization with abradants on substrates where they are used for very fine abrasive treatment of work piece surfaces.

Although the production of abrasive grain agglomerates is in principle relatively uncomplicated and is based simply on mixing together single abrasive grains with a bonding agent to then form an abrasive grain agglomerate that is subsequently heat treated, in practice, technical process problems occur in nearly all known methods for obtaining homogenous and evenly formed agglomerates with respect to the size of the agglomerates, as also with respect to the shape of the agglomerates and the composition of the agglomerates. These problems originate mostly when very fine abrasive grains of medium size of a few microns are mixed with a binder and subsequently are heat treated.

When utilizing solid binders the problem might already be based on the fact that the size of the particles of the binding agent is coarser than those of the abrasive grains to be bonded and makes any homogenous mixing harder. When using liquid binders or those diluted with solvents, the problem is oftentimes that the abrasive grains lump together, whereby a homogenous distribution of the bonding agent in the abrasive grain granulation is prevented and the production of a homogenous product made more difficult.

A further technical problem of the method, in particular when utilizing organic binders is the contamination of the apparatus used, as the mixtures of binder and abrasive grains tends to conglutinate at the walls of the apparatus. Therefore, this leads, in particular when changing products, to high cleaning maintenance, and when producing agglomerate grains, since the desired abrasive grain agglomerate of abrasive grains composed of a narrow grain size has to be realized. Such contamination with coarser grains would lead to considerable problems, for example, in abrading operations where it mostly concerns the superfine treatment of work piece surfaces, such as, for example, the treatment of decorative lacquer layers could lead to considerable problems if such contamination with coarse grains caused scratches, which subsequently would needed to be removed, if even possible, with a considerable amount of work. With bonding agents, aside from them causing contamination in the apparatus, environmental protection is also a concern, since the use of organic solvents or binders are mostly associated with annoyances such as bad smell as well as health risks.

Thus, as a basis for solving this problem, the object of the present invention was to provide abrasive grain agglomerates that do not suffer from the drawbacks of the prior art.

SUMMARY OF THE INVENTION

Object of the present invention is also to provide a method for the production of abrasive grain agglomerates that do not exhibit the type of technical problems with the methods of the prior art.

The problem, respectively the object is solved by sintered abrasive grain agglomerates including primary particles on the basis of aluminum oxide with a) a portion of aluminum oxide of at least 80% by weight b) a mean primary particle diameter of less than 5 µm c) a substantially spherical outer shape d) a portion of pores of at least 15% by volume and e) a mean agglomerate size in the range between 5 and 500 µm, wherein the primary particles are interconnected without an additional binding agent, as well as a method for the production of these abrasive grain agglomerates by the following steps:

a) wet comminuting a calcined aluminum oxide in an agitator ball mill with comminution bodies of aluminum oxide and/or stabilized zirconium oxide, b) spray drying or spray granulating the comminuted aluminum oxide dispersion resulting in agglomerate green bodies and c) sintering the agglomerate green bodies in a temperature range between 1300° C. and 1750° C. Advantageous embodiments of the abrasive grain agglomerates according to the present invention are subject of the corresponding dependent claims.

The sintered abrasive grain agglomerates according to the present invention are composed of primary particles on the basis of aluminum oxide, wherein the portion of aluminum oxide is at least 80% by weight. The mean primary particle diameter is under 5 µm and the agglomerates themselves are substantially of a spherical outer shape. The sintered abrasive grain agglomerates are not dense form bodies, but agglomerates with a portion of pores of at least 15% by volume at a mean agglomerate size in the range between 5 µm and 500 µm. In contrast to the prior art, the primary particles of aluminum oxide are interconnected without an additional bonding agent.

In order to realize reproducible abrading results, it is desired that the pores in a abrasive grain agglomerate are distributed homogenously, wherein the pore diameter should be also within a narrow range. In the abrasive grain agglomerate according to the present invention, the pores have a mean diameter of less than 2000 nm, preferably less than 1000 nm. Especially good results are realized with abrasive grain agglomerates that show a mean pore diameter between 100 nm and 300 nm.

As afore-stated, normally an even pore distribution is desired in order to obtain constant product properties. It is however also possible and can be advantageous, especially also through a suitable selection of the sinter temperature, to alter the porosity of the product and in that manner to adjust the product properties to specific purposes of application.

Advantageously, the mean primary particle diameter is below 3 µm, preferably below 1 µm and especially below 0.5 µm. The bulk density of the abrasive grain agglomerates is between 1.4 and 2.9 kg/l, whereby the abrasive grain agglomerates exhibit a specific surface (BET) between 3 and 0.1 $m^2/g$. The specific surface is influenced especially by the sintering temperature, whereby starting from a specific surface of the agglomerate body of about 20 $m^2/g$ at a sintering temperature of 1450° C., a specific surface of about 2 $m^2/g$ is reached, whereas at a higher sintering temperature, a stronger compression of, the agglomerate takes place and, for example, at 1550° C., a specific surface of only about 0.3 $m^2/g$ is measured.

As the stability of the agglomerate does not suffice to determine a grain breaking strength according to Vollstädt, a single grain breaking strength test was forgone and instead, comparable compression tests with agglomerate green bodies and agglomerates were conducted. As expected, it was shown that the agglomerate green bodies can be compressed easily, whereas the sintered abrasive grain agglomerates allow for only a small amount of compression. The final compression strength of the abrasive grain agglomerates is, as expected, higher than that of the agglomerate green bodies. After compression tests, the agglomerate green bodies are present as compact bodies, while the sintered abrasive grain agglomerates flow out of the press mold in quasi undestroyed condition. The compression tests were conducted in a simple brass ring as pressure mold into which the agglomerates were filled and then placed under pressure by means of a pressure piston with pressures up to 200 N.

The abrasive grain agglomerates preferably have a content of at least 90% by weight aluminum oxide, especially preferred at least 98% by weight. The chemical composition in certain ranges can vary according to need and preferred embodiments of abrasive grain agglomerates are provided which in summary contain up to a maximum of 20% by weight of compounds from the group of elements tungsten, titanium, chrome, zirconium, magnesium, silicon, boron, carbon and/or nitrogen, relative to the total weight of the abrasive grain agglomerate. These compounds can be provided as oxides, carbides or nitrides, whereby they may be already present as impurities in the raw material or they can be admixed during wet comminuting, respectively subsequent to the wet comminuting or, as the case may be, can be indirectly brought into the suspension as rubbed-off parts from the grinding medium.

In this context, it should be noted that the present invention also includes further possibilities that comprise the principle of the invention, namely to produce composite work material in agglomerate form, wherein the agglomerate according to the present invention quasi represents the composite base and by admixing corresponding compounds, composite agglomerates with defined portions of other hard materials or other minerals can be realized. The mean grain size of such hard material or minerals can be smaller, equal or also larger than each of the primary particles of the base material.

The method for producing of abrasive grain agglomerates starts with the wet comminution of a calcined aluminum oxide in an attritor, wherein as grinding medium aluminum oxide beads or grinding beads of stabilized zirconium oxide are preferably utilized. As raw material, a finely calcined aluminum oxide is preferably used, which is ground for the production of a suspension by means of a wet comminution, ground to or deagglomerated to a mean particle size of less than 5 µm, preferred less than 1 µm, and especially preferred less than 0.5 µm. Advantageously, the comminution is carried out by means of a vibration mill, an attritor, or a stirring apparatus ball mill. The suspension, after comminuting has most often solid matter content between about 5% by weight and about 70% by weight, preferred between about 30% by weight and about 60% by weight. According to need, organic stabilizers can be added as dispersion aids to the suspension. The comminuting preferably takes place in water, with the possibility of also adding other solvents, for example alcohols, ketones, or other polarized organic liquids, however ecological, economic and safety concerns speak against such use.

The drying of the comminuted aluminum oxide dispersion is carried out by means of spray drying, resulting in agglomerated green bodies. Which, after drying, contain a maximum residual moisture content of about 6% by weight. Especially advantageous is an intermediate product with a residual moisture content of less than 1% by weight.

Due to suitable selection of drying conditions (amount of hot air, liquid pressure, spray tower dimensions), the agglomerate size of the product can be adjusted to a relatively narrow range. In this manner, there is no problem to obtain agglomerates in the size range between 5 μm, and 500 μm. By means of predetermined adjustment of the drying parameters, the agglomerate green bodies can be obtained in a size between 30 μm and 300 μm. A further classification can be done through a subsequent screen out.

The so obtained agglomerate green bodies are then sintered in a temperature range between 1300° C. and 1750° C. No particular properties are required for the sintering method and so cylindrical rotary kilns, sliding batt kilns or oven-type furnaces can be utilized. From a technical standpoint it is advantageous, to conduct the sintering directly in a cylindrical rotary kiln, where high heat rates and short duration rates can be realized. The preferred temperature range is between 1400° C. and 1550° C.

The abrasive grain agglomerates obtained in this manner can be advantageously utilized as lapping agents as well as for the production of organically and inorganically bonded abrasive bodies and for the production of abradants on a substrate. In addition, areas of use are in wear protection coatings on the basis of inorganic, organic or elastomeric composite systems, such as for example solvents- or water-containing dyes, lacquers and powder lacquers or enamel. A further area of application is the use of impregnates in the production of wear resistant surfaces for floor coverings, such as for example laminates, parquet or PVC or CV-covering, for furniture, tiles, cooking pots and/or cooking pans.

BRIEF DESCRIPTION OF THE DRAWING

In the following paragraphs, the present invention is more specifically described based on the figures and examples.

It is shown in.

DETAILED DESCRIPTION OF PREFERRED EMBODIMENTS

Figure 1:
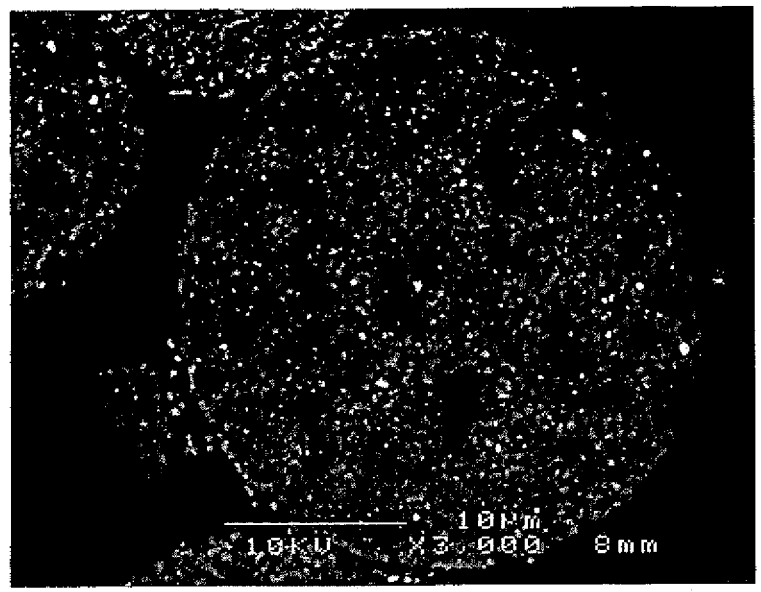
FIG. 1 a scanning electron microscope image of a section of abrasive grain agglomerate sintered at 1450° C. in a 3000 fold enlargement, FIG. 2 a scanning electron microscope image of a section of abrasive grain agglomerate sintered at 1550° C. in a 3000 fold enlargement, FIG. 3 a scanning electron microscope image of a surface of an abrasive grain agglomerates in 1000 fold enlargement, FIG. 4 a scanning electron microscope image of a bulk of an abrasive grain agglomerates in 30-fold enlargement, FIGS. 5-8 each a pore distribution curve measure via mercury porosimetry of differently screened out abrasive grain agglomerate fractions sintered at 1450° C.

After it was surprisingly found that solid and relatively compact abrasive grain agglomerates that are exceptionally suitable for grinding operations, can be obtained through simple sintering and without the use of binder agents, optimization of those abrasive grain agglomerates was worked on. Thereby, it was found that the porosity of the agglomerates plays a major role for the subsequent use as abrasive grain agglomerate. FIG. 1 illustrates a section of a scanning electron microscope image of abrasive grain agglomerate sintered at 1450° C. in 3000-fold enlargement. Thus, it is shown that a relatively large portion of pores (dark areas), which in this case are homogenously distributed across the almost ideally spherical abrasive grain agglomerate. From the illustration, it is seen that the pore size is markedly below 2000 nm, approximately in the range of about 100 nm and 300 nm. The agglomerate diameter is about 30 μm.

Figure 2:
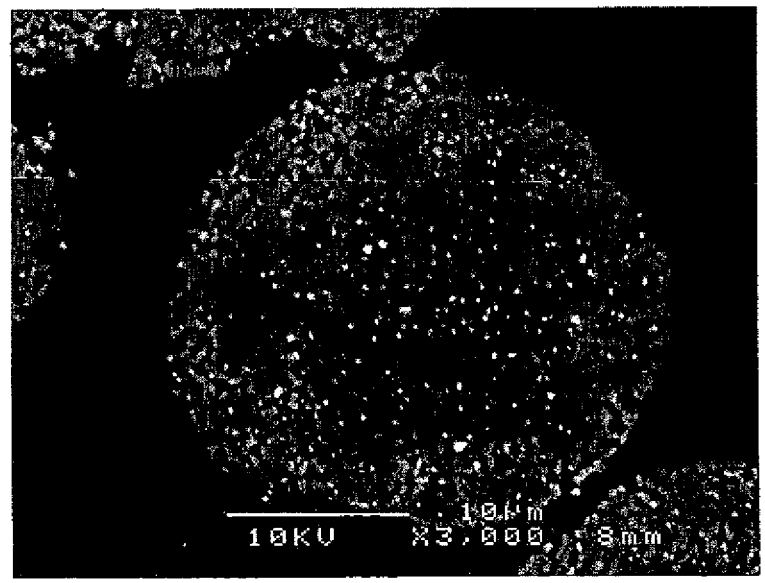

FIG. 2 shows a screen electron image of almost equally large abrasive grain agglomerate in section also in 3000-fold enlargement, wherein the abrasive grain agglomerate in this case was sintered at 1550° C. In a direct comparison with FIG. 1, it is easily seen that the abrasive grain agglomerate sintered at 1550° C. in the center is essentially denser and that due to the higher sintering temperature, obviously a compression of agglomerates has taken place. The abrasive grain agglomerate according to FIG. 2 is thus composed less homogenously, which has a negative impact especially when used in certain abrading operations and here especially, when used for abradants on substrates. It was found that an even distribution of fine pores has a positive impact on the abrading result and that excessive sintering of the product normally must be avoided, if optimal result is desired. Depending on the application, it can be advantageous, to produce deliberately more dense and less porous materials that can be utilized for special applications. An example for such applications is the wear protection of very thin lacquer coatings. The compact very finely grained aluminous abrasive grains that are normally utilized have a pore free and relatively smooth surface, from which, upon mechanical stress, the aluminous abrasive grains easily break out from the coat of lacquer.

The agglomerate grain as illustrated in FIG. 2 shows a porous surface (or coating) of a compact core. With a suitable liquid lacquer system, this porous surface, when using the agglomerate grain as wear protection, can be infiltrated in a thin lacquer layer due to its capillary property and after corresponding hardening of the lacquer, a material-interconnecting engagement between the agglomerate grain and lacquer layer with an increased bonding stability results. At the same time, the core that has not been sintered possesses a higher compression strength as compared to a homogenous porous agglomerate grain.

Figure 3:

FIG. 3 is directed to a scanning electron microscope image of the surface of abrasive grain agglomerate in 10000-fold enlargement. This illustration shows especially the primary particle diameter, whereby in this case, the mean primary particle diameter is markedly below 1 μm.

Figure 4:
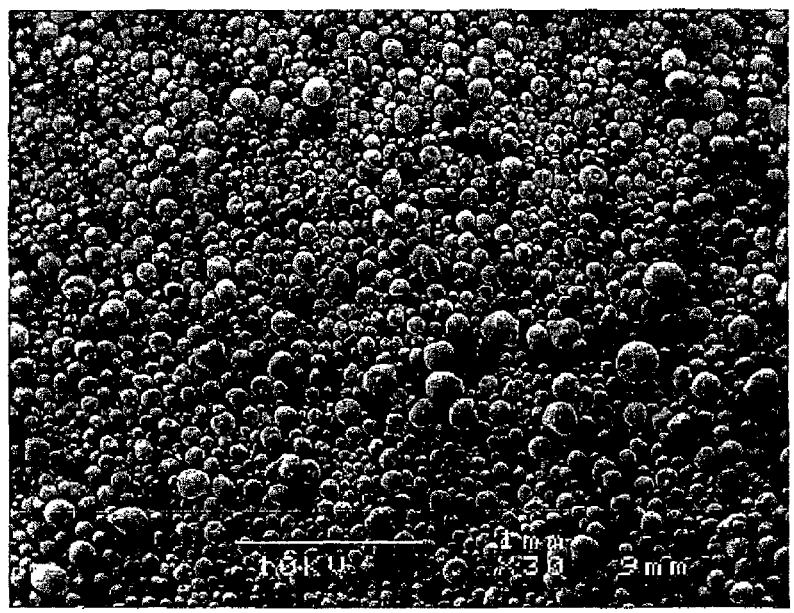

FIG. 4 shows a scanning electron microscope image in 30-fold enlargement of a multitude of abrasive grain agglomerates. Thus, an agglomerate size distribution is shown, as it normally occurs in spray drying. The largest single agglomerates are in the range of about 200 μm, while the smallest agglomerates have an agglomerate size of about 20 μm to about 30 μm. Depending on the application for the abrasive grain agglomerates, certain fractions can be screened out without problems, such that for later abrading or wear protection applications, depending on need, relatively narrow grain distributions can be readily provided.

Further investigations relative to pore distribution were conducted, which are explained in more detail by means of FIGS. 5-8 and described in more detail in the following paragraphs by means of corresponding tabulated measurements.

Figure 5:
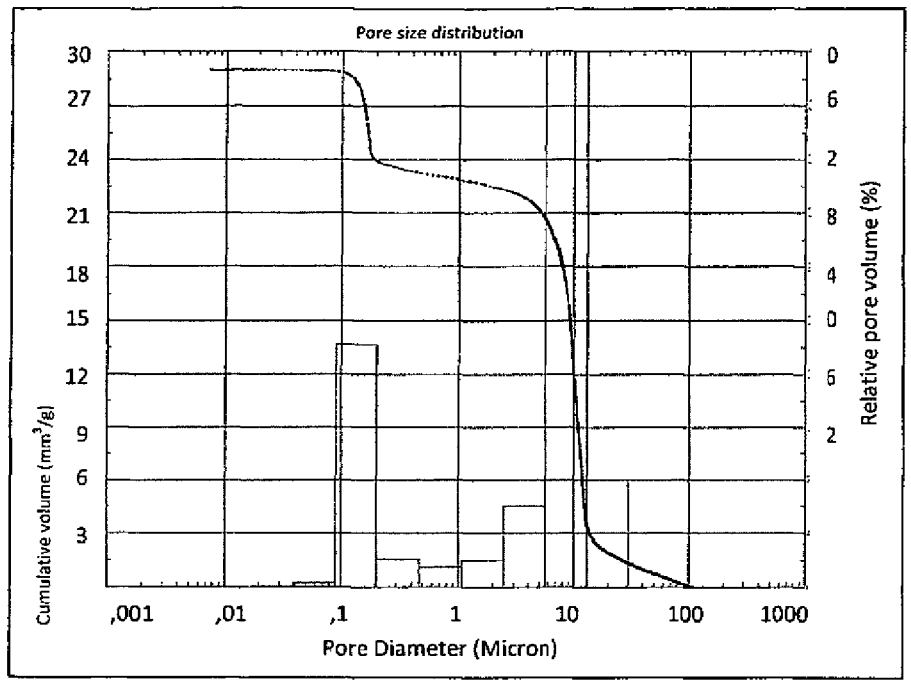

The graphic representation of pore size distribution in FIG. 5 of an abrasive grain agglomerate fraction sintered at 1450°

C. having an agglomerate size between 0 μm and 32 μm is summarized in the following Table 1.

TABLE 1

| General agglomerate data | Pore size distribution (Hg-Porosimetry) | |
|---|---|---|
| Sintering temperature: 1450° C. | Pore size (μm) | Relative pore volume (%) |
| Agglomerate fraction: | 110-57 | 2.08 |
| 0-32 μm | 57-30 | 2.49 |
| Bulk density: | 30-15 | 4.46 |
| 1.58 g/cm³ | 15-8 | 52.87 |
| Specific surface: | 8-4 | 12.86 |
| 2.10 m²/g | 4-2 | 2.63 |
| Total porosity: | 2-1 | 1.48 |
| 61.04% | 1-0.6 | 0.82 |
| Mean pore diameter: | 0.6-0.3 | 1.59 |
| 8.56 μm | 0.3-0.1 | 18.23 |
|  | 0.1-0.05 | 0.44 |
|  | 0.05-0.01 | 0.05 |

In the graphic illustration of the above tabularized pore size distribution it is seen that the distribution is bimodal with a maximum of pores in the range from 15 μm to 8 μm and a further maximum in the range from 300 nm to 100 nm. As can also be shown later through the coarser agglomerate fractions, the bimodal distribution can be attributed exclusively to the measurement method, since in the mercury porosimetry agglomerate bulk is measured, wherein not only the pores in the agglomerates are measured, but most of all also the empty spaces between the single particles of the bulk. At an agglomerate size between 0 μm and 32 μm, the diameters of these spaces are between 15 μm and 8 μm. The actual pores that characterize the abrasive grain agglomerate are in the range from 300 μm to 100 μm. The measured total porosity thus does not relate to the single abrasive grain agglomerate, but again, relates to the bulk, wherein the porosity of the abrasive grain agglomerate itself in the present case is only at about 19% by volume.

Figure 6:
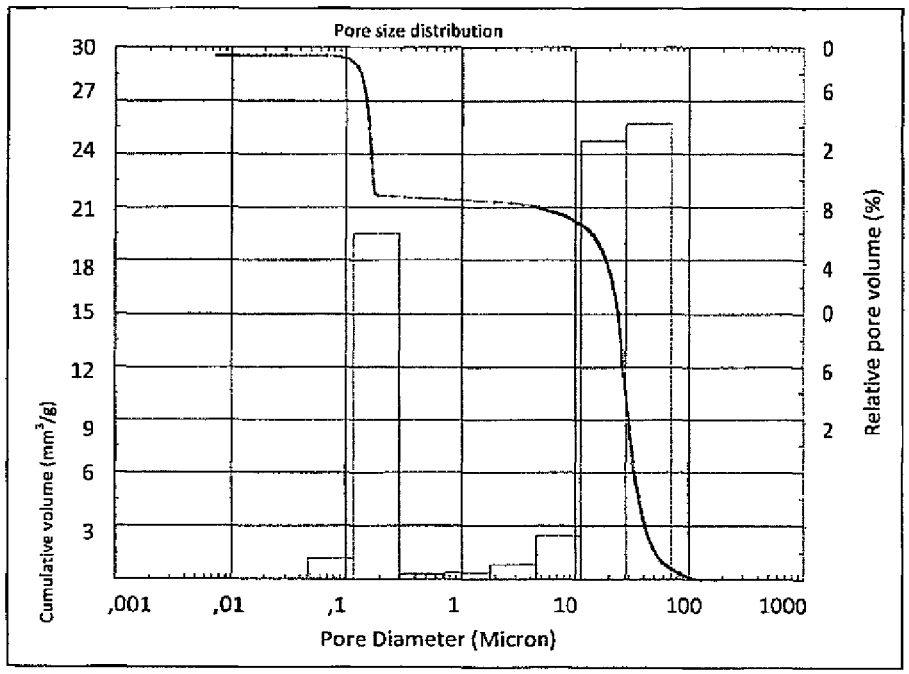

In FIG. 6, the pore size distribution for an abrasive grain agglomerate fraction sintered at 1450° C. in the range from 32 μm to 75 μm is graphically represented. The corresponding measurements are summarized in the following Table 2.

TABLE 2

| General agglomerate data | Pore size distribution (Hg-Porosimetry) | |
|---|---|---|
| Sintering temperature: 1450° C. | Pore size (μm) | Relative pore volume (%) |
| Agglomerate fraction: | 110-57 | 3.38 |
| 32-75 μm | 57-30 | 25.31 |
| Specific surface: | 30-15 | 36.28 |
| 2.16 m²/g | 15-8 | 4.4 |
| Bulk density: | 8-4 | 1.96 |
| 1.86 g/cm³ | 4-2 | 0.54 |
| Total porosity: | 2-1 | 1.47 |
| 54.86% | 1-0.6 | 0.2 |
| Mean pore diameter: | 0.6-0.3 | 0.37 |
| 44.16 μm | 0.3-0.1 | 26.29 |
|  | 0.1-0.05 | 0.78 |
|  | 0.05-0.01 | 0.00 |

In this case there is likewise a bimodal distribution of pores size, wherein the empty spaces between the single agglomerate particles and the agglomerate fraction between 32 μm and 75 μm is also shifted into the coarser range and in the range between 60 μm and 15 μm exhibit a maximum. Unchanged is the maximum of the pore size distribution of the pores that are associated with the agglomerate grain in the range from 100 nm to 300 nm. In the present case, the abrasive grain agglomerate has a porosity of about 27% by volume while the total porosity of the bulk is at 54.9% by volume. The measured mean pore diameter of the bulk is at 44.2 μm. This result is almost exclusively due to the large empty spaces between the single abrasive grain agglomerates and does not permit to draw a conclusion on the mean pore diameter of the abrasive grain agglomerate itself.

Figure 7:
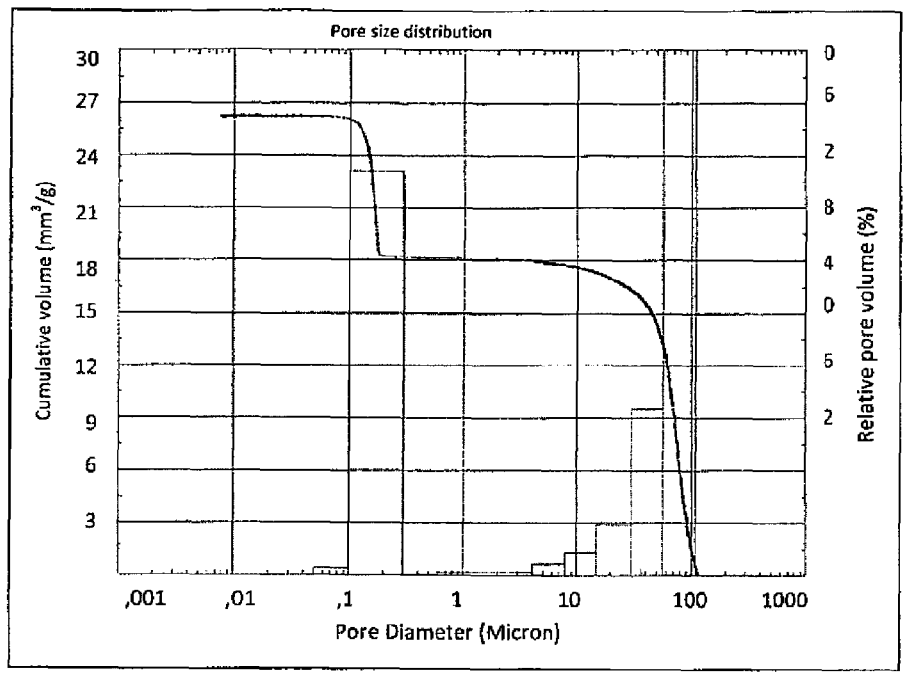

FIG. 7 shows a graphic illustration of the pore size distribution of an abrasive grain agglomerate fraction sintered at 1450° C. in the range from 150 μm to 250 μm. The respective measured results are summarized in Table 3.

The graphics shown in FIG. 7 likewise shows a bimodal function, where a maximum of fine pores in the range from 100 nm to 300 nm is shown, while the coarser pores show a maximum range of 110 μm to 57 μm. In this relatively coarse abrasive grain agglomerate fraction with 150 μm to 250 μm, the empty spaces between the single abrasive grain agglomerates, which are measured in the mercury porosimetry, show a correspondingly large diameter, which in this case is at 110 μm to 75 μm. The total porosity of the bulk lies at 56.8% by volume, while porosity of the abrasive grain agglomerates itself are at about 30.1% by volume.

TABLE 3

| General agglomerate data | Pore size distribution (Hg-Porosimetry) | |
|---|---|---|
| Sintering temperature: 1450° C. | Pore size (μm) | Relative pore volume (%) |
| Agglomerate fraction: | 110-57 | 48.82 |
| 150-250 μm | 57-30 | 12.7 |
| Specific surface: | 30-15 | 3.85 |
| 2.15 m²/g | 15-8 | 1.7 |
| Bulk density: | 8-4 | 0.89 |
| 1.96 g/cm³ | 4-2 | 0.24 |
| Total porosity: | 2-1 | 0.21 |
| 51.29% | 1-0.6 | 0.18 |
| Mean pore diameter: | 0.6-0.3 | 0.09 |
| 56.75 μm | 0.3-0.1 | 30.76 |
| For the range 0.01 to | 0.1-0.05 | 0.57 |
| 10 μm: 0.194 μm (computed) | 0.05-0.01 | 0.00 |

The direct comparison between the single abrasive grain fractions shows that the abrasive grain agglomerates themselves are almost exclusively marked by nanoscale pores in the range between 100 nm and 300 nm.

In order to measure the true mean pore diameter, further measurements were conducted, in which only the range between 1 μm and 10 nm was used to determine the mean pore diameter.

Figure 8:
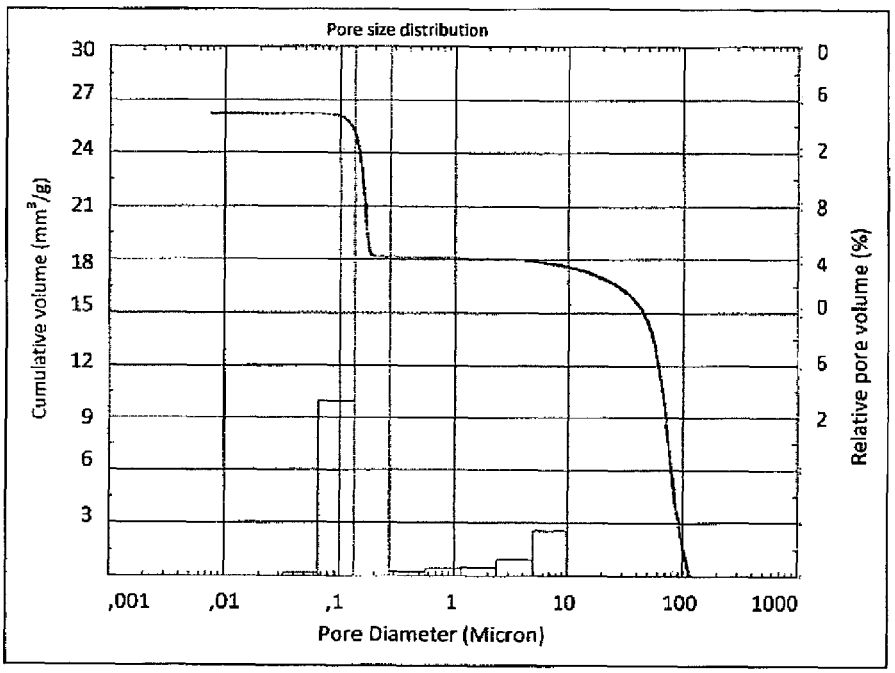

FIG. 8 shows in a graphic representation, the pore size distribution of the abrasive grain agglomerate fraction sintered at 1450° C. in the range from 150 μm to 250 μm. As can be seen, the cut-off pore size range above 10 μm has the effect that with 0.194 μm an essentially more realistic mean pore diameter is computed for the abrasive grain agglomerate, wherein the coarse pore range of the empty spaces does not have that much importance anymore.

In the following examples, the production as well as the use of the abrasive grain agglomerates according to the present invention are described.

EXAMPLE 1

Commercially available calcined aluminum oxide (Nabalox No.: 713-10 RF, Fa. Nabaltec) is ground in a stirrer ball mill using Y-stabilized zirconium oxide grinding balls to a mean grains size between 0.35 µm and 0.55 µm in wet condition. The particle size of the particle in the about 50% suspension was determined by means of a Sympatec-Helos-grain size measurement apparatus. A particle size of $D_{90\%}$=0.85 µm, $D_{50\%}$=0.44 µm, and $D_{10\%}$=0.2 µm was determined. The surface was determined to 20.6 m$^2$/g (BET). This suspension was subsequently spray dried, wherein the grain size of the agglomerate was set in the range from 0 µm to 200 µm. Subsequently, a sintering operation followed in the oven-type furnace at different sinter temperatures, wherein the agglomerate green body each were held for about 30 minutes at the predetermined sintering temperature. Samples were each taken at 1450° C., 1500° C. and 1550° C. sintered.

EXAMPLE 2

From the agglomerate grain fraction produced as in Example 1 that were sintered at different temperatures, a more narrow grain size range was screened out, which was adjusted to a FEPA-grain F100. For the following tests a special fused alumina grain was also utilized as grain 100 (ALODUR WSK, Fa. Treibacher). Of each of the four grainings, an aqueous suspension was produced, in which each 3 g of abrasive grain was mixed with 40 ml of distilled water. These suspensions were each put in a stainless steel vessel and subjected to an ultrasound finger (20 kHz, 200 Watt) for 10, 15, 20, 25 and 30 minutes each. The suspensions were then transferred into glass flasks and after undergoing a 2 day settling period their settling behavior photographically documented and evaluated.

The high grade corundum white (ALODUR WSK, Treibacher) shows even after a treatment time of 30 minutes only a small amount of chipping at the stainless steel vessel as well as on the ultrasound finger. The chipped metal particles are relatively coarse and sediment well, so that for all treatment periods an almost clear solution remains.

The abrasive grain agglomerate sintered at 1450° C. in contrast, shows a markedly higher chip removal. Thus, the chipped metal particles are very small, so that quasi no sedimentation occurs and the solutions even after two days are dark gray to black.

The abrasive grain agglomerates sintered at 1500° C. cause markedly worse chipping and a constant turbidity of the solution is first recognized in the sample with a treatment period of 30 minutes, while the remaining samples are sedimenting.

The abrasive grain agglomerate sintered at 1550° C. behaves comparably to the high grade corundum white and even at 30 minutes treatment time an almost clear solution remains.

This behavior is explained by the increasing binding stability that occurs with increasing sintering temperature between the primary particles, the increasing crystal formation due to increased sintering temperature and the decreasing pore volume at increased sintering temperature.

EXAMPLE 3

For the simulation of an ultrasound-lapping process, and analogous to example 2, various lapping suspensions having a higher solid content portion were produced. Therefore, 100 g solid matter (abrasive grain agglomerate or high grade corundum) was added to 120 ml water.

The ultrasound finger was form-fittingly connected with a matt finish sheet metal of Cr—Ni-stainless steel, as well as in a further test, with a matt finish sheet metal of an aluminum-alloy.

After a lapping period of each 30 minutes, the surface of the test sheet metals were examined. It could be determined that the suspension with the abrasive grain agglomerates sintered at 1450° C. had the lowest surface roughness. Comparison was made with an high grade corundum suspension as well as suspensions of abrasive grain agglomerates sintered at 1500° C. and 1550° C. These results thus correlate with the micro chip removal results found in example 2.

EXAMPLE 4

After it was surprisingly found that the porous agglomerates exhibit a marked capillarity and are quickly and easily filled through infiltration with liquids, such as for example, aqueous or oil based liquid lubrication material, further tests in this direction were conducted.

An agglomerate graining sintered at 1450° C. screened for a grain size in the range between 60 and 100 µm was infiltrated by simple mixing in an intensive mixer with poly methylsiloxane-oil (Fa. Bayer, Baysilon ÖI M50) or a corresponding oil emulsion (Fa. Bayer, Baysilon Ölemulsion). Thus, the dry flow capacity of the mixtures were used as a measure of the amount of oil necessary to complete infiltration, wherein this case, up to an amount of ca. 16 ml emulsion or 14 ml oil per 100 g agglomerate grain, a still flow capable mixture was realized.

400 g of agglomerate grain was infiltrated with 40 ml emulsion from which grinding belts were produced for the treatment of lacquer surfaces in automobiles. As a reference, a grinding belt with non-treated agglomerates was produced. The production of the belts themselves was carried out through wet coating of an agglomerate grain/resin-suspension by means of a wiping blade to a support and subsequent hardening.

The lacquer surface was then treated with abrading disks that had been stamped out from the grinding belts by means of a conventional eccentric grinding machine. In the subsequent measuring of the surface roughness, it was found that the belts with the infiltrated agglomerates, as compared to the bands with the non-treated agglomerates, effected a lower mean surface roughness and thus showed a finer polished section, which in particular, proves advantageous in the surface treatment of auto body lacquers. This refined polish section can be possibly based on an in situ oil lubrication during polishing.

The afore-described results show that the sintered porous abrasive grain agglomerates are suited as grinding-lapping- or polishing agents.

For applications in bonded abradents, where normally high contact pressures are applied which cannot be resisted by the abrasive grain agglomerate having a homogenous pore distribution, the more compact abrasive grain agglomerates sintered at higher temperatures can be of advantage. The same is applicable also to the use in wear protection coating, whereby the type of wear and the wear mechanism will be determinative.

What is claimed is:

1. Sintered abrasive grain agglomerates comprising primary particles on the basis of aluminum oxide with
   a) a portion of aluminum oxide of at least 80% by weight
   b) a mean primary particle diameter of less than 3 µm
   c) a substantially spherical outer shape
   d) a portion of pores of at least 15% by volume and
   e) a mean agglomerate size in the range between 5 and 500 µm wherein the primary particles are interconnected without an additional binding agent.

2. Abrasive grain agglomerates according to claim 1, wherein the pores have a mean diameter of less than 2000 nm.

3. Abrasive grain agglomerates according to claim 1, wherein the pores have a mean diameter of less than 1000 nm.

4. Abrasive grain agglomerates according to claim 1, wherein the abrasive grain agglomerates exhibit a bulk density between 1.4 and 2.9 kg/l.

5. Abrasive grain agglomerates according to claim 1, wherein the abrasive grain agglomerates exhibit a specific surface (BET) between 3 and 0.1 $m^2/g$.

6. Abrasive grain agglomerates according to claim 1, wherein the abrasive grain agglomerates include up to maximally 20% by weight relative to the total weight of the abrasive grain agglomerate of one or more compounds of the group of elements consisting of W, Ti, Cr, Zr, Mg, Fe, Si, B, C N.

7. A method for the production of abrasive grain agglomerates according to claim 1, comprising the steps of:
 a) wet comminution of a calcined aluminum oxide in an agitator ball mill with comminution bodies of aluminum oxide and/or stabilized zirconium oxide,
 b) spray drying or spray granulating the comminuted aluminum oxide dispersion resulting in agglomerate green bodies and
 c) sintering the agglomerate green bodies in a temperature range between 1300° C. and 1750° C.

8. A method of using the abrasive grain agglomerates according to claim 1 as a lapping agent in a lapping process comprising:
 providing a suitable lapping suspension and applying it in the lapping process.

9. The method of claim 7, further comprising the step of bonding the abrasive grain agglomerates to produce organically or inorganically bonded abrasive bodies.

10. A method of using abrasive grain agglomerates according to claim 1 for wear protection coatings comprising: forming on inorganic or organic or elastomeric composite systems on the basis of the abrasive grain agglomerates comprising solvent containing or water based dyes, lacquers, powder lacquers or enamel for tiles, cooking pots and pans and impregnates which are laminates for floor coverings, parquet or PVC- or CV-coverings and coverings for furniture surfaces.

11. Abrasive grain agglomerates according to claim 3, wherein the mean diameter of the pores is between 100 and 300 nm.

12. Abrasive grain agglomerates according to claim 1 wherein the mean primary particle diameter is less than 1 μm.

13. Abrasive grain agglomerates according to claim 12, wherein the mean primary particle diameter is less than 0.5 μm.

14. Abrasive grain agglomerates according to claim 1, wherein the content of aluminum oxide is at least 90% by weight.

15. Abrasive grain agglomerates according to claim 14, wherein the content of aluminum oxide is 98% by weight.

* * * * *